UNITED STATES PATENT OFFICE.

GEORGE HERBERT EARP-THOMAS, OF WELLINGTON, NEW ZEALAND.

PROCESS OF PREPARING AND GROWING AND DISTRIBUTING ORGANISMS WHICH FIX OR GATHER ATMOSPHERIC NITROGEN.

No. 816,850.          Specification of Letters Patent.          Patented April 3, 1906.

Application filed September 29, 1905. Serial No. 280,663.

*To all whom it may concern:*

Be it known that I, GEORGE HERBERT EARP-THOMAS, a British subject, and a resident of Wellington, in the Colony of New Zealand, a temporary resident of Toronto, in the county of York and Province of Ontario, Canada, have invented a new and useful Process of Preparing and Growing and Distributing Organisms which Fix or Gather Atmospheric Nitrogen; and I hereby declare that the following is a full, clear, and exact description of the same.

This discovery consists of an improved and simplified method of preparing and growing nitrogen-gathering bacteria for distribution and intensifying the virulence or infectiousness of the organisms to a degree hitherto unknown.

The process essentially consists of growing the bacteria in corked and sealed vessels by a nitrogen-free medium for a given period until the organisms reach a stage of exalted virulence. The growth being very profuse in the medium permits immediate and direct inoculation of the seed or soil.

In carrying out this process a nodule is obtained from the roots of a leguminous plant—such as alfalfa, beans, peas, clover, &c.—and washed until the skin is thoroughly clean. The nodule is then immersed in a sterilizing solution, such as corrosive sublimate of one one-thousandth strength if the nodule is large or sterilized water if the nodule is small, for a period of about three minutes. The nodule is then removed from the sterilizing solution and placed on absorbent paper to dry for a period of one minute. When dried, it is seized, with a pair of sterile forceps, and the skin cut, with a sterile instrument, so that when broken open it will show a clean fractured surface. A small quantity of the bacteria from the center of the nodule is then removed with a sterile blade and placed in a drop of sterilized water in a sterilized vessel. These bacteria are then rubbed into the water until the latter turns milky. One drop of the milky fluid is then taken on a sterile platinum loop and placed in a culture vessel containing a culture medium, and this vessel is placed in an incubator heated to a temperature of 25° centigrade and kept there from two to four days or until the bacteria colonies develop. The bacteria from these colonies are then transferred to vessels containing media to be kept when proved as pure bacteria stock culture for preparing or growing the bacteria for distribution to the users.

To prepare or grow the bacteria for distribution to the users, suitable vessels or bottles containing specially-prepared media free from nitrogen and of a solid non-fluid or liquid nature, but preferably solid, are employed, and in each of these vessels is placed a small quantity of the pure bacteria stock culture. These vessels are then placed in an incubator, heated to a temperature of approximately 25° centigrade, and kept there for a period of about four days or until the bacteria colonies have developed. Owing to the lack of nitrogen, the bacteria are in a very virulent condition, which may be described as meaning that the vital properties of the bacteria are exalted to such a state that they will rapidly multiply and eagerly seek for nitrogen. In preparing the special medium fourteen grams of wood-ash are steeped in two thousand two hundred and ten cubic centimeters of clear water, heated to 212° Fahrenheit, for a period of one minute and then filtered clear. Into this clear filtrate put a stiffening agent, such as twenty-six grams of shredded agar, and boil it till the agar is dissolved. Then put into this solution thirty-five grams of dissolved maltose and then filter the final solution till quite clear. This filtrate is put into bottles one-third full and sterilized for half an hour on each of three successive days. As the agar is hard to filter, another method to prepare this medium is to heat the ash in one-quarter of the quantity of water and the agar in the other three-quarters and filter each separately before adding the maltose. When the maltose has been added and dissolved, the final solution is filtered and sterilized, as above described. The ash being of a distinctly-alkaline nature by its reactions upon the acids of the other constituents acts as a neutralizing agent and produces a neutral medium or a faintly-alkaline nutrient medium.

The vessels or bottles of bacteria may be sent to the user corked or sealed, if they are for immediate use; but if they are to be kept for future use a hole is made in the cork and stuffed with antiseptic cotton to allow the entrance of air to the contents. The bottles are packed in suitable cases and sent to the user with directions stating the quantity of seed the contents are capable of inoculating and the amount of water to be used. The user has then only to empty the bacteria from the bottle into the quantity of water marked in his directions and then spray this water on his seed or dip them into it. The seed may then be planted immediately or dried and planted in a few days, and in the former case the addition of a minute quantity of sugar and ash in the water is an advantage. This method is so simple that the user cannot reasonably make any mistake and is much quicker and less troublesome than other methods in which he has to develop the bacteria after receiving them, such development requiring skilled or scientific knowledge and even with the exercise of the greatest care entailing the risk of spoiling the whole culture. With the pure culture grown in this method the user will have no trouble in obtaining the best results in every case. If the organisms prepared by this process are not used before they have attained their maximum growth and have deteriorated in virulence, they may be restored to active virulence by the employment of a small quantity of a liquid medium consisting of approximately fifteen hundred cubic centimeters of water, ten grams ash, and twenty-nine grams maltose, more or less. The organisms are kept growing on the medium till two or three days before using, and then to bring them to active virulence the neck of both bottles should be heated with a flame for a few seconds to sterilize them, and the corks removed, and a small quantity of the liquid medium poured into the organisms on the solid medium, and the bottle of culture recorked and placed in a warm room from two to four days or until the culture liquid turns milky. It is then ready to be diluted with water and put on the seed as directed. By this method the bacteria can be kept till required by the user and without trouble developed to their greatest virulence by adding the liquid medium a few days before seeding-time.

In cases where it is necessary for the user to spray a large quantity of seed or to spray a field of poorly-grown crops lacking in nitrogen the bottle of bacteria culture can be developed by the user as follows: Boil one pint of sugar and half a pint of plain wood-ash in five quarts of fresh water until the sugar is dissolved, then strain this through canvas or linen to remove the debris of ash, and while hot pour into a tub containing ten gallons of water, preferably boiled and cooled. Pour a little water previously boiled and cooled into the bottle of culture and then wash thoroughly all the bacteria from the bottle of culture into the tub of water. The tub of water, which must not be more than milk-warm when the bacteria are placed in it, is then covered to prevent contamination, and preferably kept in a warm room at an even temperature from two to five days until the water is milky. The milky water is then mixed with from one hundred to five hundred gallons of water and sprayed on the fields, which will be well supplied with the organisms, if the directions have been observed. The proper proportions of sugar and ash, with directions for use, can be sent with each bottle of bacteria to the users, stating the extent of ground they will fertilize after development; but the users can increase the proportions of sugar, ash, and water according to their individual requirements. A satisfactory method of preparing a liquid medium is as follows: Boil two and a-half gallons of clean water with two ounces of plain wood-ash for five minutes and then strain with linen and place the clear filtrate in a clean vessel and boil again with five and one-half ounces of maltose or sugar till the sugar is dissolved—say from five to ten minutes—then cool to milk-warm and add the bacteria to it by washing them out of the bottles with water previously boiled and cooled. Now cover up this solution for two days free from dust until the water is milky. A good way to hasten the growth of the bacteria at this period is to add two ounces of ammonium phosphate for forty-eight hours and when milky dilute it with water, and then put it on the fields or seeds. The seeds must be kept out of the sunlight after inoculation. One pint of this milky solution will be strong enough to mix with five gallons of water. If necessary to prepare larger quantities of bacteria, this milky water may be put into a tank of water prepared with sugar and ash according to the correct proportions and then kept till milky and sprayed on the fields after sunset.

The chemical reactions resulting from the affinity of the ash and sugar results, as in the case of the ash and maltose, in the production of a neutral medium or a faintly-alkaline nutrient medium.

In the specification and claims I have used the term "distribution vessel" to designate such receptacles as are suitable to contain a nutrient medium in which the nitrogen-gathering bacteria may be transported by mail, express, or freight to distribute the bacteria from the laboratory to the purchasers, such a distribution vessel being distinguished by the fact that it may contain the medium in a moist condition, whereby the bacteria may be distributed in a virulent condition as distinguished from the distribution in a dry condition upon dry fibrous material, which is not a nutrient medium, and upon which the bacteria are in practically a spore or dormant condition, from which spore must afterward be produced or developed the virulent bacteria—that is to say, propagated—in something the same manner that a plant may be said to be propagated from a seed.

In referring to the restoration of the bacteria by supplying them with a restoring medium, which step is an important feature of my invention, I use the term "restoring" to distinguish from developing as indicating a process of reviving the motile bacteria as distinguished from propagating such bacteria from dried spores or large rods.

Having thus fully described my invention, what I claim as new, and desire to secure by Letters Patent, is—

1. The herein-described process which consists of thoroughly cleaning and sterilizing the nodule of a leguminous plant, then fracturing it while sterilized, and obtaining from it a quantity of bacteria in a bacteriologically-pure condition and mixing them with a corresponding quantity of sterilized water until a milky fluid is produced, then taking a predetermined quantity of the milky fluid and placing it in a culture vessel with a medium substantially free from nitrogen, and maintaining the culture vessel at developing temperature until the bacteria colonies appear.

2. The herein-described process which consists of thoroughly cleaning and sterilizing the nodule of a leguminous plant, then fracturing it while sterilized, and obtaining from it a quantity of bacteria in a bacteriologically-pure condition and mixing them with a corresponding quantity of sterilized water until a milky fluid is produced, then taking a predetermined quantity of the milky fluid and placing it in a culture vessel with a medium substantially free from nitrogen, and maintaining the culture vessel at developing-temperature until the bacteria colonies appear, then transferring part of the bacteria colonies to distributing vessels containing media, and maintaining these distributing vessels at a developing temperature until the bacteria colonies have developed.

3. The herein-described process which consists of thoroughly cleaning and sterilizing the nodule of a leguminous plant of the nitrogenous class, then fracturing the nodule while sterilized, and obtaining from it a quantity of bacteria in a bacteriologically-pure condition, then mixing with it a corresponding quantity of sterilized water until a milky fluid is produced, then taking a small quantity of the milky fluid and placing it in a culture vessel containing a medium and maintaining this culture vessel and its contents at a substantially even temperature of approximately 25° centigrade until the bacteria colonies appear, then transferring a small quantity of the bacteria colonies to distribution vessels containing media, and maintaining these last-mentioned vessels at a substantially even temperature of about 25° centigrade until the bacteria colonies have developed.

4. A process for preparing, growing and distributing organisms which fix or gather atmospheric nitrogen consisting of preparing and growing the organisms and maintaining them virulent in distributing vessels.

5. A process for preparing, growing and distributing organisms which fix or gather atmospheric nitrogen consisting of preparing and growing the organisms and maintaining them virulent in a distributing vessel by a medium contained therein.

6. A process for preparing and growing and distributing organisms which fix or gather atmospheric nitrogen, consisting of preparing the organisms, growing and distributing them on a moist medium of a non-nitrogenous character.

7. A process for preparing and growing and distributing organisms which fix or gather atmospheric nitrogen consisting of preparing and growing the organisms bacteriologically pure and maintaining them in distributing vessels in a substantially non-nitrogeous environment.

8. The process of distributing nitrogen-gathering organisms, which consists in transferring such organisms from a laboratory stock culture to a distributing vessel substantially closed against access of air and containing a medium of a non-nitrogenous character, and transporting them in said distributing vessel.

9. The process of distributing virulent nitrogen-gathering organisms, which consists in transporting them in a substantially nitrogen-free environment.

10. The process of restoring non-virulent organisms contained in a distributing vessel which consists in providing a vessel with a sterilized medium, bringing the vessels into juxtaposition and discharging the contents of one into the other.

11. The process of restoring the virulency of non-virulent nitrogen-gathering organisms, which consists in supplying medium of a non-nitrogenous character to distributing vessels containing said non-virulent organisms.

12. A medium for the culture of organisms which fix or gather atmospheric nitrogen comprising ash, agar, maltose, and water.

13. A medium for the culture of organisms which fix or gather atmospheric nitrogen comprising fourteen grams of ash, two thousand two hundred and ten cubic centimeters of water, twenty-six grams of shredded agar, and thirty-five grams of maltose.

14. A medium for the culture of organisms which fix or gather atmospheric nitrogen comprising fourteen grams of ash, two thousand two hundred and ten cubic centimeters of water, twenty-six grams of shredded agar, and thirty-five grams of maltose, and a restoring medium proportionally consisting of fifteen hundred cubic centimeters of water, ten grams of ash, and twenty-six grams of maltose.

15. A non-nitrogenous medium for preparing and growing and distributing organisms which fix or gather atmospheric nitrogen comprising, ash, carbohydrate, and water.

16. A non-nitrogenous medium for preparing and growing and distributing organisms which fix or gather atmospheric nitrogen comprising carbohydrate, water and neutralizing agent.

17. A non-nitrogenous medium for preparing and growing and distributing organisms which fix or gather atmospheric nitrogen comprising ash, carbohydrate, water and a stiffening agent.

18. A medium containing nitrogen-gathering bacteria in sealed distributing vessels.

19. A medium for the culture and distribution of nitrogen-gathering organisms, said medium being free from nitrogen and containing the constituents of wood-ash.

20. A bacteriological ditributing-package containing virulent nitrogen-gathering bacteria in a substantially nitrogen-free environment.

21. A bacteriological distributing-package comprising a receptacle, a non-nitrogenous medium contained therein, a culture of nitrogen-gathering organisms carried by the medium and means for restricting the access of air to the receptacle.

22. A bacteriological distributing-package comprising a sealed receptacle, a non-nitrogenous medium contained therein and a culture of virulent nitrogen-gathering organisms carried by the medium.

23. A bacteriological distributing-package comprising a receptacle, a non-nitrogenous medium, and a culture of virulent nitrogen-gathering organisms carried by the medium, said medium containing the constituents of wood-ash.

24. A bacteriological distributing-package comprising a receptacle, a culture medium, and a culture of nitrogen-gathering organisms, said medium containing ash.

25. A bacteriological distribution-package comprising a receptacle, a culture medium and virulent nitrogen-gathering organisms in said receptacle.

Toronto, September 22, 1905

GEORGE HERBERT EARP-THOMAS.

In presence of—
 C. H. RICHES,
 H. L. TRIMBLE.